Jan. 27, 1953
E. W. GRAHAM
2,627,062
MEASURING DEVICE
Filed Nov. 12, 1947
2 SHEETS—SHEET 1
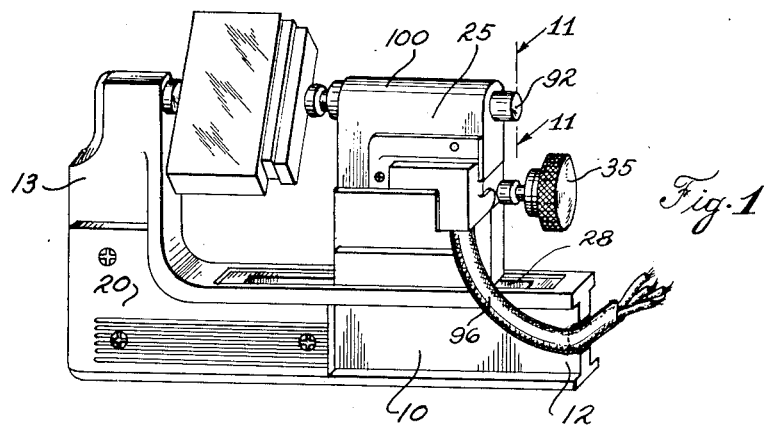
Fig. 1
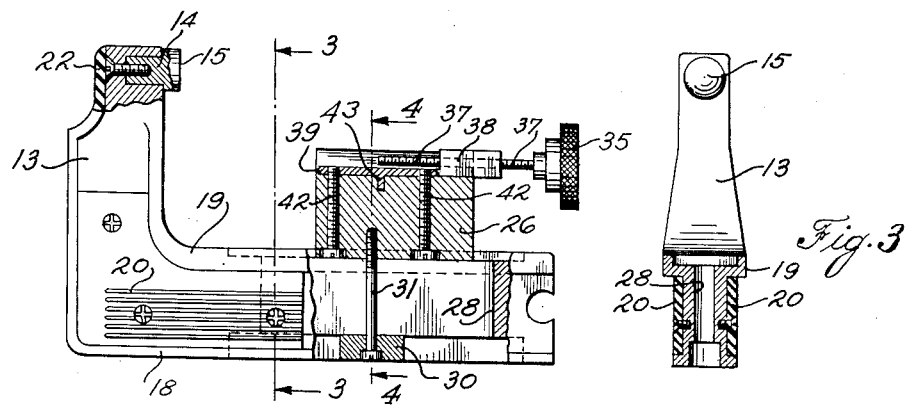
Fig. 2
Fig. 3
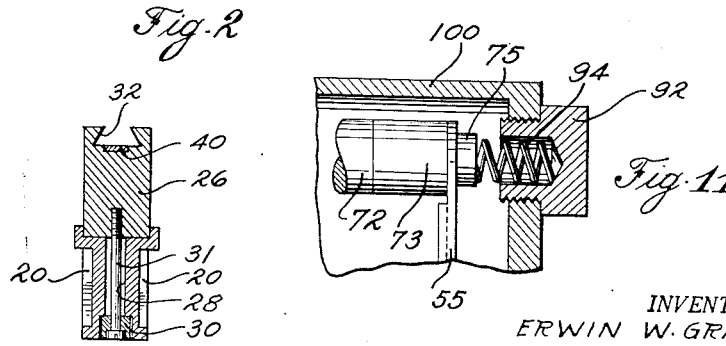
Fig. 4
Fig. 11
INVENTOR.
ERWIN W. GRAHAM
BY
Bosworth & Sessions
ATTORNEYS Jan. 27, 1953 E. W. GRAHAM 2,627,062
MEASURING DEVICE
Filed Nov. 12, 1947 2 SHEETS—SHEET 2
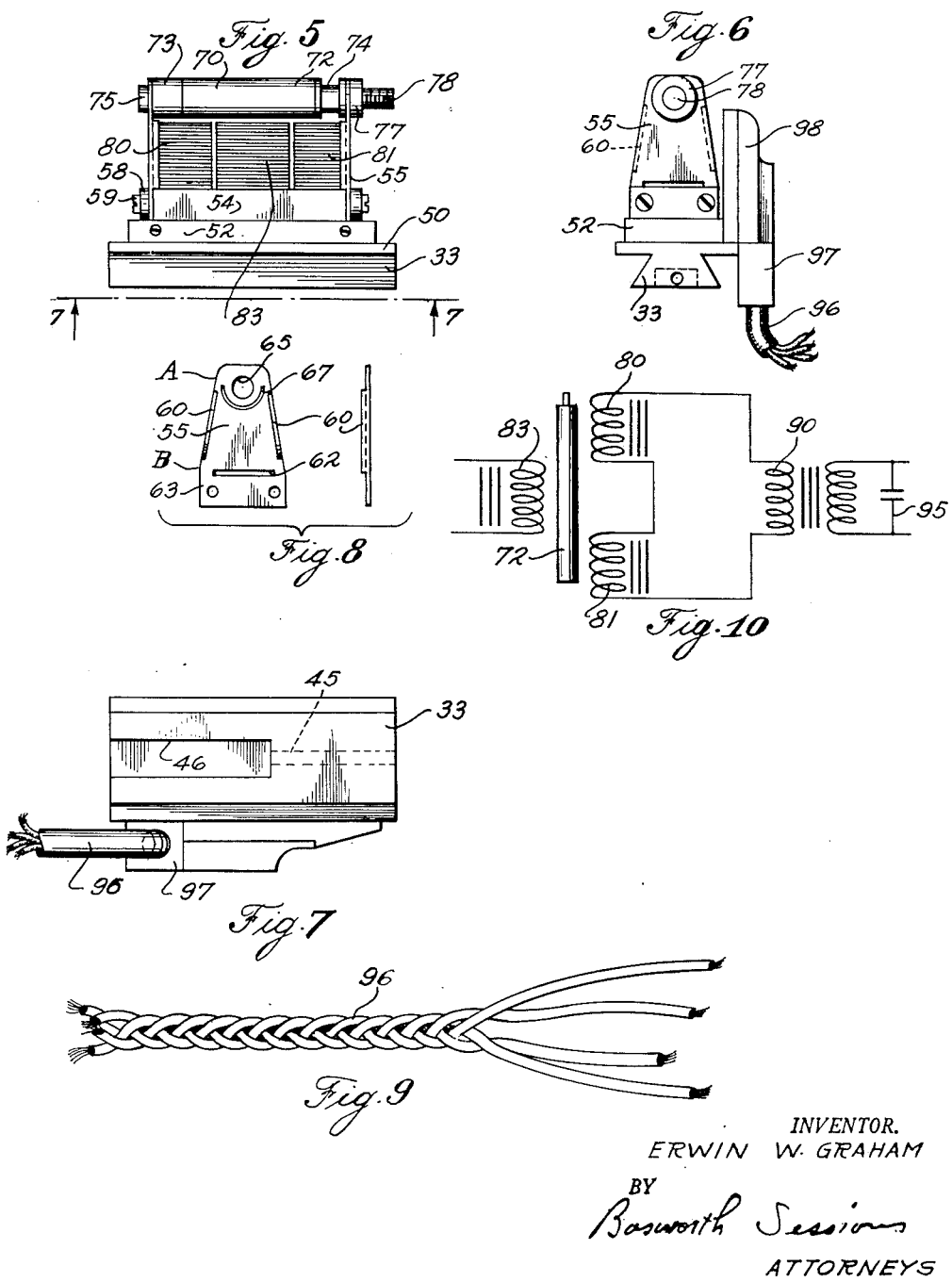
INVENTOR.
ERWIN W. GRAHAM
BY
Bosworth Sessions
ATTORNEYS Patented Jan. 27, 1953

2,627,062

UNITED STATES PATENT OFFICE 2,627,062

MEASURING DEVICE

Erwin W. Graham, Parma Heights, Ohio, assignor, by mesne assignments, to Cleveland Instrument Company, a corporation of Ohio Application November 12, 1947, Serial No. 785,315

10 Claims. (Cl. 336—132)

This invention relates to measuring instruments and more particularly to those instruments in which a small amount of mechanical motion applied to a transducer establishes an electric current that is amplified electronically to operate a suitable indicating device such as a meter or recorder.

Taking measurements electronically with the use of a vacuum tube amplifier is old and various devices have been built to translate a limited amount of mechanical motion into a magnified signal through the medium of such an amplifier. Devices of this type have been subject to certain disadvantages in that the mechanical components of the instrument were not sufficiently rigid or rugged to be comparable to the sensitivity that could be obtained with the circuits involved.

A general object of the present invention is to provide an improved mechanism for use in taking measurements that are amplified and then interpreted with an indicating device. Another object of the invention is to provide an improved transducer or pickup unit for use in translating movement of an indicator finger into an electric current. A further object is to provide a mechanical mounting for a pickup unit that is capable of utilizing to the fullest possible extent the response characteristics of a suitable amplifier system. An additional object is to provide a pickup unit with a movable pole piece that is resiliently mounted for movement with respect to adjacent transformer iron components without materially altering its spacing with respect to them. Still a further object is to provide a device with a measuring anvil or surface and pickup unit finger mounted for movement relative to each other to permit accurate mechanical adjustment of the spacing between them for different measuring conditions.

Other objects of the invention will become apparent from the following specification and the attached drawings; the novel features thereof being summarized in the claims. It will be evident to those skilled in the art that variations may be made in the constructions disclosed herein without departing from the scope of the invention which is limited solely by the claims.

In said annexed drawings: Figure 1 is a side perspective view of an assembled micrometer device embodying the present invention and showing the cable that leads from the pickup unit to the amplifier; Figure 2 is a side elevation, partly in section, of the device illustrated in Figure 1 with the transducer removed; Figure 3 is a section through Figure 2 as indicated by the lines 3—3 thereon; Figure 4 is a section through Figure 2 as indicated by the lines 4—4 thereon; Figure 5 is a side elevation on an enlarged scale of the transducer unit with its cover removed; Figure 6 is an end elevation of the transducer illustrated in Figure 5; Figure 7 is a bottom plan view of the transducer unit; Figure 8 is a detail showing the construction of the springs by which the movable pole piece is supported adjacent the coils of the pickup; Figure 9 is a detail view showing the manner in which the novel braided conductor cord used with the present invention is prepared; Figure 10 is a wiring diagram showing the circuit connections of the transducer; and, Figure 11 is a detail section as indicated by lines 11—11 on Figure 1.

Referring now particularly to Figures 1, 2 and 3 it will be seen that one form of the present invention embodies an L-shaped frame 10 including a leg portion 12 and an arm portion 13. A removable anvil 14 with a flat surface 15 is mounted in the arm portion by means of a screw as indicated in Figure 2. The arm portion of the frame lies at right angles to the leg or body portion and the two meet at a central part and are bounded on each side by integral reinforcing ribs 18 and 19 each including two right angled portions, one carried by the leg and the other by the arm portion of the frame.

The instrument of the present invention is adapted for use in making close measurements of such accuracy that the heat imparted to the metal frame by the hand of the user may be an important factor because of warming the frame and causing it to expand somewhat. For this reason three composition or hard rubber plates are provided on the frame and are engaged by the user's hand, insulating the metal frame from the heating effect of the hand. These include two L-shaped plates 20 screwed as shown in Figure 1 to the frame 10 on opposite sides thereof and a third and curved plate 22 screwed to the anvil arm portion of the frame behind the anvil 14. The proper procedure in use is to rest the thumb against the plate 22 and grip the frame by the hand and base of the thumb between the opposed plates 20 without bringing the hand in contact with the steel frame 10.

The transducer or pickup unit is indicated generally at 25 and is mounted on a post 26 (Figure 2) formed for sliding motion back and forth in a guideway between opposite ribs 19 and on top of the web of the frame leg 12. The web of the frame is provided with a longitudinal opening 28 in which is mounted a key 30 secured by a screw 31 to the underside of the block 26. Coarse adjustment of the position of the block on the frame is made by loosening the screw 31 and shifting the block back and forth in its guideway until the proper position is reached after which the screw 31 is again tightened to keep the block in position.

Fine mechanical adjustment of the position of the transducer unit 25 with respect to the anvil surface 15 is obtained by mounting the unit in a dove-tail guideway 32 (Figure 4) on the top surface of the block 26 parallel to the guideway just described. The transducer unit is formed on its underside as indicated at 33 (Figure 6) closely to fit within the dove-tailed guideway 32 for movement back and forth as desired.

Such back and forth motion is controlled by rotation of a knurled knob 35 secured to a shaft 37 that is differentially threaded to provide a vernier adjustment as the knob is rotated. To this end one portion of the shaft is threaded, in the example described, with thirty-two threads to the inch and is received within a sleeve 38 secured to a finger 39 mounted in a slot 40 in the bottom of the key way 32 and held in place by screws 42, being accurately positioned therein by a pin 43 entering a corresponding hole in the block 26 (Figure 2). The end of the shaft 37 is threaded with forty threads to the inch and is threadingly received within an axially extending hole 45 (Figure 7) in the dove-tail 33 of the transducer unit; the hole is at the end of the recessed portion 46 to permit entry of the sleeve 38.

From the description thus far it will be evident that the transducer slide 50 may be adjusted back and forth with respect to the anvil surface 15 mechanically over one or another guideway by a coarse or fine motion; the coarse motion being obtained by loosening of the scew 31 and sliding the block 26 and the fine adjustment being obtained by turning the knob 35 to actuate the differential screw threads on the shaft 37.

The transducer or pickup unit mounted on the slide 50 is best illustrated in Figures 5, 6 and 7. Referring to these figures it will be seen that a small plate 52 is either integrally formed as part of the slide 50 or is permanently secured thereto as shown and includes an upstanding part 54 the opposite ends of which are square to provide shoulders against which triangular spring members 55 are held by strips 58 secured in place by small screws 59.

The two spring members 55 support the movable pole piece of the pickup unit and each is formed as in Figure 8; the unique construction there shown forming an important feature of the present invention. In that figure each spring member is seen as made of flat strip spring stock of roughly triangular shape and provided along both edges with an outturned flange 60 that functions to impart rigidity to the central portion of the triangular spring member. As close as possible to the place where the spring member is clamped between the strip 58 and the portion 54 of the block it is provided with an elongate slot 62 or holes to weaken the spring across portions 63 and insure bending at this point rather than in the central portion of the spring member. In like fashion the top of the springs that support the pole piece in holes 65 each are provided with a semi-circular slot 67 extending beneath the hole 65 and up to, or past the horizontal center line.

As a result of the construction just described each spring member 55 may be bent easily along the lines indicated by A and B but is substantially rigid between them. It will be evident that the portion of the spring material surrounding the hole 65 and inside of the slot 67 may move independently of the central portion; that is to say, it may retain its original position with respect to the pole piece supported thereby while the central portion may become positioned at a slight angle to the axis of the pole piece as the latter moves along its axis.

The pole piece is indicated at 70 and includes a central soft iron portion 72 spaced inwardly from the spring members by non-magnetic sleeves 73 and 74 and is held in place by a non-magnetic head 75 and a non-magnetic nut 77 threadingly received on a projecting end 78 of the pole piece unit 74. The extending threaded portion 78 may be provided with any type of indicating finger or button desired, which finger or button cooperates with the surface 15 of the anvil 14 and between which the object to be measured is inserted. It is the displacement of the pole piece button when the object is so inserted and the consequent shifting of the iron member 72 from a balanced position between coils 80 and 81 against the resiliency of the spring members 55 that provides the necessary mechanical motion by which the indicating current is established.

As the iron pole piece 72 is shifted back and forth on its axis it changes the flux paths established through two pickup coils 80 and 81 that are positioned on opposite sides of an exciter coil 83 as shown in Figure 5 and diagrammatically in Figure 10 and throws the currents in them out of balance. Each of the three coils is wound with very fine copper wire about a transformer iron core and the ends of the cores adjacent the pole pieces 72 are very accurately spaced therefrom. The core is shaped like an E with coils 80 and 81 on the outside legs and coil 83 on the central leg. The part of the core connecting the legs lies adjacent part 54. The entire transducer assembly is accurately made so the spring members 55 and the coil cores are accurately located with respect to the pole piece 72 both axially thereof and with respect to its ends. The exciter coil 83 is preferably supplied with current of the same frequency as is made available to the indicator tube of an amplifier system as described in copending application Serial No. 771,528 in the name of Michael Bozoian and assigned to my assignee.

In order properly to position the pole piece 72 and the springs 55 the mechanism shown in Figure 11 is provided comprising a hollow cap 92 threadingly mounted in the cover 100, hereafter described, and receiving in its hollow portion a coil spring 94. The spring bears against the non-magnetic head 75 and by virtue of being somewhat compressed urges the pole piece unit toward the left (Figure 11) to prevent chatter and also to position the same properly. If desired adjustment in the spring tension may be provided by positioning the cap 92 in any desired location on the threads.

As the movable pole piece 72 shifts out of balance in the fields of the coils 80 and 81 each pickup coil transmits an alternating sine wave of different strength to a primary 90 of an iron core transformer, the two signals being 180° out of phase. Ordinarily the secondary leads of the transformer across which a condenser 95 is placed, lead to the grids of a double triode resistance coupled amplifier. The anode output from this stage leads, preferably, to a second resistance-capacitance coupled double triode amplifier.

The leads from the anodes of the last amplifier stage go to the grids of a third double triode tube at the indicator or detector stage of the circuit. A meter, recorder or other indicating device may be connected across the anodes of the indicator tube, the indicator tube and the pickup coil 83 being supplied with alternating current of the same frequency.

It will be evident from the above description that as a finger or button on the thread 78 is moved the iron pole piece 72 shifts so that its longitudinal axis always remains parallel to its initial position and only shifts a minute amount to one side with respect thereto; the spring members bending as columns through their intermediate portions due to the action of the ribs 60 and the cut out configurations therein. The construction described reduces the amount of force that otherwise would be required to push the pole piece or armature axially and at the same time provides stiff springs radially to maintain the parts in the desired position with respect to each other.

The current to supply the exciter coil 83 and the leads from the pickup coils 80 and 81 are brought to the pickup head by the four lead flexible braided cable indicated at 96 and braided as shown in Figure 9. The cable enters the pickup through a depending portion 97 thereof (Figure 6) and is brought into a hollow portion 98 rigid with the block 50 and in which the actual connections between the cable and the leads from the coils are completed.

The entire pickup unit normally is covered with a shell 100 whose exterior is shown in Figure 1 and whose interior conforms to the shape of the pickup unit. It rests against the portion 98 of the block 50, surrounds the unit and is secured in place by suitable screws.

From the foregoing description it will be evident that I have provided a mechanical measuring unit and a transducer therefor that is of improved construction and that is rigid in use and easy and accurate of adjustment.

Having described my invention, what I claim is:

1. In a transducer mechanism comprising a supporting block, an indicating finger, an iron pole piece associated therewith and mounted for movement along an axis, the improvement which comprises resilient triangular flat leaf springs with their triangular base portions secured to said block and at their apexes secured to said pole piece, each of said springs being provided with an upstanding rib to be relatively stiff through their midportions and with slots adjacent said block and said pole piece to weaken them against bending at these points to cause bending of said springs at controlled points adjacent the block and pole piece respectively consequent upon movement of said pole piece.

2. A transducer mechanism comprising a supporting block, an indicating finger, an iron pole piece associated therewith and mounted for movement along an axis, resilient triangular flat leaf springs with their triangular base portions secured to said block and at their apexes secured to said pole piece, each of said springs being provided with an upstanding rib to be relatively stiff through their midportions and with slots adjacent said block and said pole piece to weaken them against bending at these points to cause bending of said springs at controlled points adjacent the block and pole piece respectively consequent upon movement of said pole piece, an E-shaped iron core with the legs of the E normal to the direction of motion of said pole piece and terminating in pole faces lying parallel to the direction of motion of said pole piece and closely adjacent to said pole piece, an exciter coil wound on the central leg of said core and a pickup coil mounted on each outer leg of said coil, said pickup coils being connected in series and adapted to generate an electric current consequent upon mechanical motion of said indicating finger and said pole piece.

3. In a transducer, a supporting block, a plurality of coils mounted on said supporting block, a core structure for said coils, an elongated armature movable along its axis with respect to said coils and said supporting block, said core structure providing pole faces lying parallel to the axis of said armature and disposed closely adjacent to said armature and means for supporting said armature for such movement comprising a pair of spaced parallel flat leaf springs disposed at right angles to the axis of said armature and rigidly secured to said block and to said armature, said springs each having upstanding stiffening flanges intermediate the zones of connection of said springs with said body and said armature, said springs each having a transversely extending slot extending partially across the spring adjacent its zone of connection with said block to provide a weakened portion, and said springs each having an arcuate slot adjacent its zone of connection with said armature, said arcuate slot extending substantially half way around said armature and being disposed between said armature and said body, both ends of the slot lying substantially in the plane of the axis of the armature, whereby the bending of the springs adjacent said armature in response to axial movements of said armature takes place primarily in the plane of the axis of the armature.

4. In a measuring device, a support, a member movable with respect to the support, and means for mounting said member for such movement comprising a pair of spaced parallel flat springs rigidly secured to said support and to said member, said springs having stiffened intermediate portions and weakened portions adjacent the zones of connection of said springs with said support and said member respectively, whereby said springs bend primarily at said weakened portions when said member is moved with respect to said body.

5. The invention defined in claim 4 wherein the springs are weakened by slots extending generally transversely of the springs adjacent said zones of connection.

6. The invention defined in claim 5 wherein said member is elongated and is movable along its axis, and wherein the slot in each spring adjacent its zone of connection with said member is arcuate and extends substantially half way around the member and is disposed between the member and the support, both ends of the slot lying substantially in the plane of the axis of the member, whereby the bending of the springs adjacent said member takes place primarily in the plane of the axis of the member.

7. The invention defined in claim 4 wherein the intermediate portions of the springs are stiffened by upstanding flanges on the edges thereof.

8. In a measuring device, a support, a member movable with respect to the support, and means for mounting said member for such movement comprising a pair of spaced parallel flat springs rigidly secured to said support and to said member, said springs having stiffened intermediate portions and weakened portions adjacent the zones of connection of said springs with said member, whereby the bending of said springs adjacent said member takes place primarily at said weakened portions when said member is moved with respect to said body.

9. In a measuring device, a support, a member movable with respect to the support, and means for mounting said member for such movement comprising a pair of spaced parallel flat springs rigidly secured to said support and to said member, said springs having weakened portions adjacent the zones of connection of said springs with said support and said member respectively, whereby said springs bend primarily at said weakened portions when said member is moved with respect to said body.

10. In a measuring device, a support, a member movable with respect to the support, and means for mounting said member for such movement comprising a pair of spaced parallel flat springs rigidly secured to said support and to said member, each of said springs having a slot adjacent the zone of connection with said member, said slots being arcuate and being disposed between said member and said support, the ends of each slot terminating substantially in the plane of the axis of the member whereby the bending of the springs adjacent said member takes place primarily in the plane of the axis of the member.

ERWIN W. GRAHAM.

REFERENCES CITED

The following references are of record in the file of this patent:

UNITED STATES PATENTS

| Number | Name | Date |
|---|---|---|
| 1,769,077 | Small | July 1, 1930 |
| 2,173,464 | Aldeborgh et al. | Sept. 19, 1939 |
| 2,177,399 | Aller | Oct. 24, 1939 |
| 2,207,625 | Lester | July 9, 1940 |
| 2,281,453 | Peterson | Apr. 28, 1942 |
| 2,361,738 | Bird | Oct. 31, 1944 |
| 2,365,592 | Reason | Dec. 19, 1944 |
| 2,365,593 | Rights et al. | Dec. 19, 1944 |
| 2,392,170 | Manke | Jan. 1, 1946 |
| 2,443,661 | Lenehan | June 22, 1948 |
| 2,445,455 | Rights | July 20, 1948 |
| 2,499,665 | Mestas | Mar. 7, 1950 |